United States Patent [19]

Hollmann et al.

[11] Patent Number: 5,485,007
[45] Date of Patent: Jan. 16, 1996

[54] OPTICAL FIBER QUADRANT DETECTOR HAVING A SENSOR HEAD WITH INTERMIXED RECEIVING AND TRANSMITTING OPTICAL FIBERS

[75] Inventors: Joerg W. Hollmann, Midland; Gabor Devenyi, West Pentang, both of Canada

[73] Assignee: Hughes Aircraft Company, Los Angeles, Calif.

[21] Appl. No.: 152,773

[22] Filed: Nov. 15, 1993

[51] Int. Cl.⁶ ........................................................ H01J 5/16
[52] U.S. Cl. .............................. 250/227.28; 250/227.11; 385/116
[58] Field of Search ................ 250/227.28, 227.21, 250/227.14, 227.24, 227.32, 227.11; 385/115, 116, 120, 121, 89, 33, 52, 27, 43

[56] References Cited

U.S. PATENT DOCUMENTS 3,384,755  5/1968  Williamson et al. .............. 250/227.21
3,484,614  12/1969  Tobey et al. ........................ 250/227.28
3,609,367  9/1971  Barron ................................. 250/227.28
3,940,608  2/1976  Kissinger et al. .................. 250/227.28

*Primary Examiner*—David C. Nelms
*Assistant Examiner*—Que T. Le
*Attorney, Agent, or Firm*—Hugh P. Gortler; M. W. Sales; W. K. Denson-Low

[57] ABSTRACT

An optical fiber quadrant detector (10) includes a sensor head (22) wherein each quadrant (A, B, C, D) thereof includes a plurality of light transmitting optical fibers (26) and a plurality of light receiving optical fibers (20). The light transmitting optical fibers (26) are equally distributed among the quadrants (A, B, C, D) as are the light receiving optical fibers (20). Hence, the outputs of the lights receiving optical fibers (20) are indicative of the alignment of a workpiece to the sensor head (22).

14 Claims, 2 Drawing Sheets

5,485,007

OPTICAL FIBER QUADRANT DETECTOR HAVING A SENSOR HEAD WITH INTERMIXED RECEIVING AND TRANSMITTING OPTICAL FIBERS

BACKGROUND OF THE INVENTION

The present invention generally relates to an optical fiber quadrant detector and, in particular, relates to one such optical fiber quadrant detector having a sensing head wherein each quadrant includes a plurality of light transmitting optical fibers and a plurality of light receiving optical fibers.

Quadrant detectors are generally known in the art. Full quadrant detectors are frequently used to optically align a workpiece to a preselected position. For example, in setting up a mechanism, such as an optical bench, the bed of the mechanism can be aligned parallel with a reference plane by use of a precisely positioned quadrant detector disposed in the reference plane but removed from the bed of the mechanism. In such an operation a mirror could be affixed to the bed of the mechanism and, by measuring the relative tilt in the x and y directions with the quadrant detector, the bed can be precisely positioned with respect to the reference plane of the quadrant detector. In such an operation the quadrant detector is, effectively, operated as a null detector, i.e. the goal is to align the reflected light from the bed until each quadrant receives the same amount of reflected light.

Another use for quadrant detectors is the measurement of optical properties, such as astigmatism, of spherical lenses. In such an application a lens to be measured is disposed so that the light reflected therefrom is directed onto the quadrant detector. The amount of light reflected from the lens is then determined as the lens is rotated. The variation of the light measured in each quadrant gives a measure of the aberration of the lens.

In general, in most quadrant detector arrangements the apparatus used frequently includes beam splitting optics as well as various lenses. One significant drawback associated with the use of beam spitters is that only about one half of the original light signal is ultimately projected toward the workpiece. Hence, such arrangements generally require powerful light sources and/or relatively sensitive quadrant detector devices.

Currently, conventional quadrant detector devices include a light sensitive surface adapted to produce an electrical signal having a known relationship to the intensity of the light impinging on the surface. To fully utilize such devices requires that each quadrant react identically, or at least be calibrated so that the output signal of each quadrant is the same as each other quadrant for the same light intensity. A further difficulty with such detectors is that the electrical response of the material making up the light sensitive surface may vary over time and operating conditions. Hence, such quadrant detectors must be frequently recalibrated to compensate for such variations. These drawbacks tend to limit the usefulness and applications for quadrant detectors.

Consequently, it is highly desirable to provide a quadrant detector that substantially completely overcomes the above-recited drawbacks of conventional quadrant detectors.

SUMMARY OF THE INVENTION

Accordingly, it is one object of the present invention to provide an optical fiber quadrant detector that substantially completely overcomes the above-recited difficulties.

This object is accomplished, at least in part, by an optical fiber quadrant detector having an optical fiber sensor head. Each quadrant of the sensor head includes a plurality of optical fibers for transmitting light from the sensor head and a plurality of optical fibers for receiving light at the sensor head surface.

Other objects and advantages of the present invention will become apparent to those skilled in the art from the following detailed description read in conjunction with the appended claims and the drawings attached hereto.

DETAIL DESCRIPTION OF THE INVENTION

An optical fiber quadrant detector, generally indicated at 10 in the Figures and embodying the principles of the present invention, includes first, second, third and fourth bundles, 12, 14, 16, and 18, respectively, of optical fibers 20 each terminating at one end thereof in a different quadrant, A, B, C, and D of a sensor head 22, and a fifth bundle 24 of optical fibers 26 also terminating at one end thereof in the quadrants, A, B, C, and D of the sensor head 22.

Figure 3:
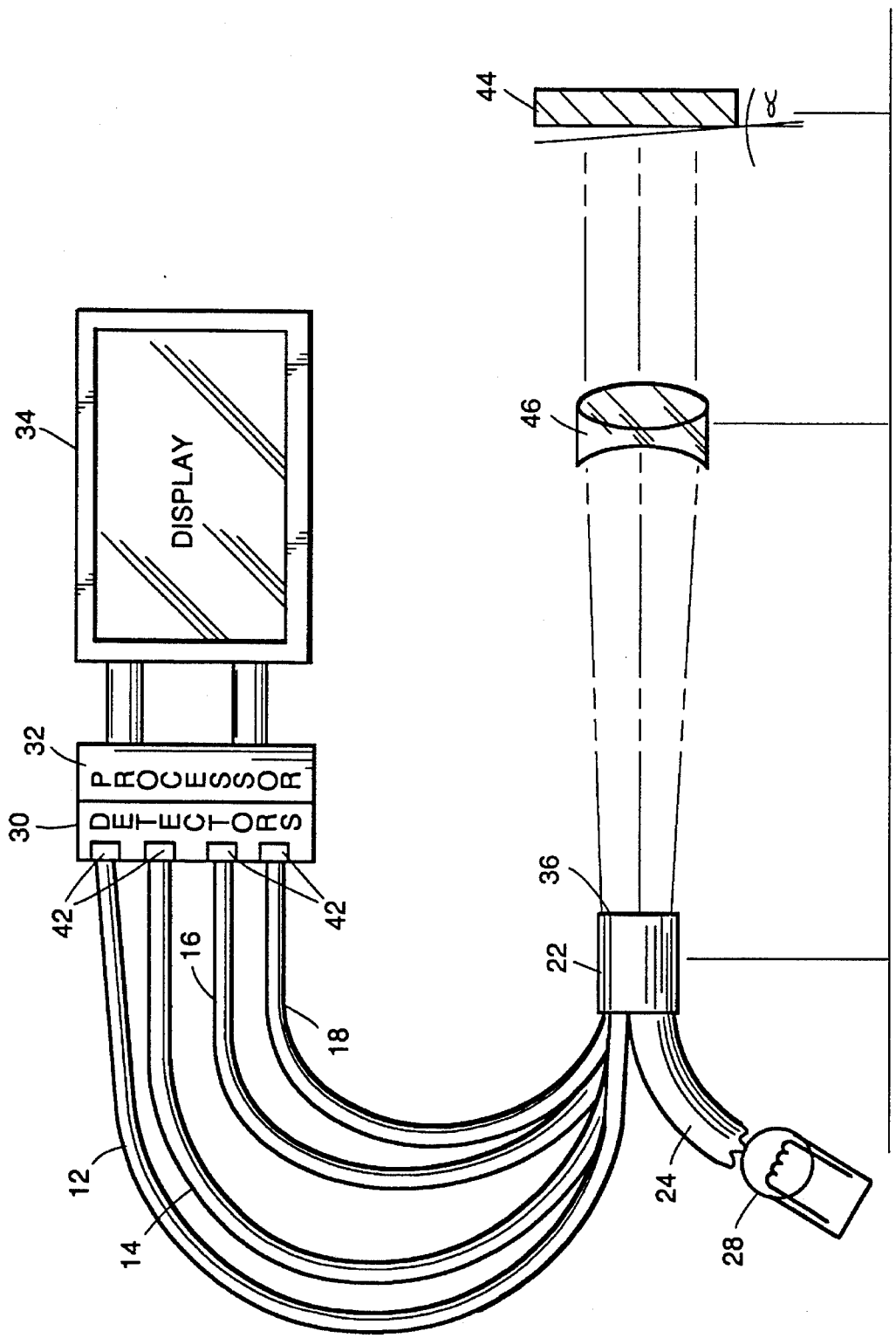
FIG. 3 is an exemplary optical measuring system employing the optical fiber quadrant detector shown in FIG. 1.

Preferably, in one embodiment, the optical fiber quadrant detector 10 further includes, as shown in FIG. 3, means 28 for providing light for transmission through the optical fibers 26 of the fifth bundle 24, means 30 for receiving light signals from the first, second, third, and fourth bundles, 12, 14, 16, and 18, respectively, of optical fibers 20, means 32 for processing signals from the light receiving means 30, and means 34 for displaying the output from the processing means 32.

In one preferred embodiment, each of the bundles, 12, 14, 16, and 18 of optical fibers 20 has an equal number of optical fibers 20 therein. Further, in the preferred embodiment, the optical fibers 26 of the fifth bundle 24 are equally divided among the quadrants, A, B, C, and D of the sensor head 22. As a result, the quantity of light emerging from each quadrant, A, B, C, and D, and impinging upon a workpiece is the same for each quadrant, A, B, C, and D. Further, each quadrant, A, B, C, and D, because each of the first, second, third and fourth bundles, 12, 14, 16, and 18, respectively, has the same number of optical fibers 20 associated therewith, has the same light receiving area available to receive light reflected from the workpiece. In one particular embodiment, each of the first, second, third, and fourth bundles, 12, 14, 16, and 18, respectively, contain about 6200 optical fibers 20 and the fifth bundle 24 contains about 25,000 optical fibers 26.

Further, in the preferred embodiment, to ensure a substantially equal light distribution as well as a substantially equal light sensitivity, the optical fibers, 20 and 26, in each quadrant, A, B, C, and D, are randomly distributed within that quadrant, A, B, C, and D. In one particular embodiment, the number of optical fibers 26 in the fifth bundle 24 is equal to the sum of optical fibers 20 in the first through fourth bundles, 12, 14, 16, and 18. Consequently, in each quadrant, A, B, C, and D, half of the optical fibers are from one of the first, second, third or fourth bundles, 12, 14, 16, and 18 and the other half are from the fifth bundle 24 of optical fibers 26.

As shown in the Figures, all of the bundles, 12, 14, 16, 18, and 24 terminate in the sensor end 36 of the sensor head 22. In the preferred embodiment, the sensor head 22 is divided into the four quadrants, A, B, C, and D by the walls 38. In one particular embodiment, the sensor head 22 has a diameter on the order of about 0.5 inches. The sensor head 22 can be fabricated using known optical fiber termination techniques. Typically, such a sensor head 22 will be fabricated using conventional techniques from quartz, glass, plastic or the like.

Figure 1:
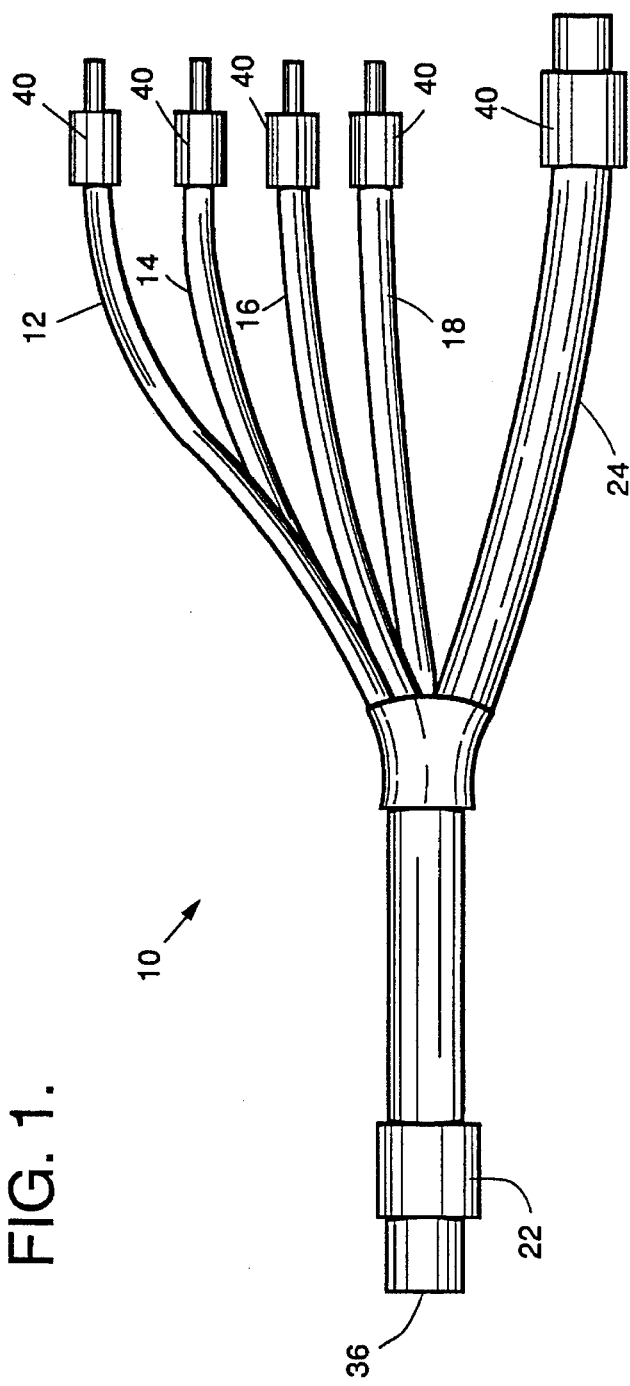
FIG. 1 is a pictorial view of an optical fiber quadrant detector embodying the principles of the present invention.
Figure 2:
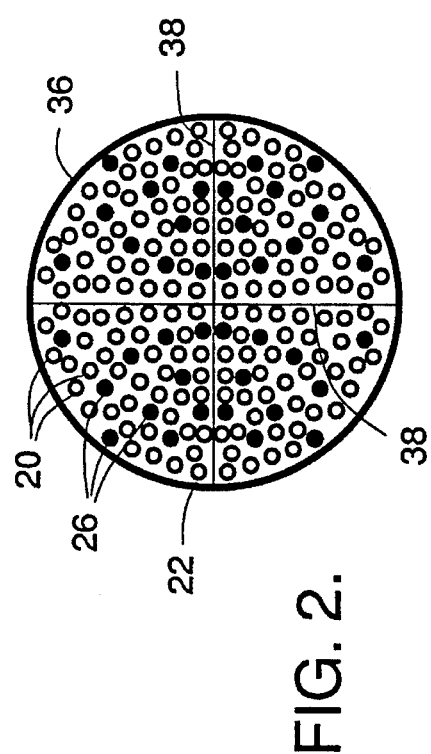
FIG. 2 is an end view of the optical fiber quadrant detector sensor head shown in FIG. 1.

Similarly, as shown in FIGS. 1 and 3, each bundle, 12, 14, 16, 18, of optical fibers 20, as well as the fifth bundle 24 of optical fibers 26 individually terminate into fiber optic connectors 40 at the ends thereof distal the sensor head 22.

In the preferred embodiment, the means 28, shown in FIG. 3, for transmitting light through the optical fibers 26 of the fifth bundle 24 can be almost any conventional light source. Typically, however, the light source will be a halogen lamp, a quartz lamp, or the like. Further, in the event that optical elements are required or desired between the light source and the optical fibers 26 of the fifth bundle 24 each quadrant, A, B, C, and D, will, nonetheless, receive, and hence, transmit to the workpiece, the same amount of light. In addition, in such embodiments where such optical elements are disposed between the light source and the fifth bundle 24 of optical fibers 26 any losses resulting therefrom can be compensated for by providing a higher intensity light source.

Typically, the means 30 for receiving light from the first, second, third, and fourth bundles, 12, 14, 16, 18, of optical fibers 20 are individual light detectors 42 that produce electrical signals that are related to the amount of light impinging upon the photosensitive surfaces thereof. Such light detectors 42 are well known in the art and usually produce an output signal the strength of which is proportional to a photocurrent generated in response to the intensity of light impinging thereon. Advantageously, the fact that the light signal from each quadrant is carried by a separate bundle of optical fibers 20 in conjunction with the provision of a light detector 42 for each of the bundles, 12, 14, 16, 18, prevents light from more than one quadrant from impinging upon any individual detector. As a result, each detector 42 operates more efficiently. In one particular embodiment, the light detectors 42 are available from EG+G, and can be, for example, VTB 1113 blue sensitive photodiodes.

In one embodiment, the means 32 for processing signals is a preprogrammed computer that receives the electrical signals outputted from the light detectors 42 as input signals. In one particular embodiment the means 32 includes a personal computer. Typically, for autocollimnation, for example, the means 32 for processing signals from the light detectors 42 first generates a sum of the signals from the quadrants, A, B, C, and D, as follows: A+D; B+C; A+B; and D+C. Thereafter, the x-coordinate signal is calculated by the difference determination (A+D)−(B+C). Similarly, the y-coordinate signal is calculated by the difference determination (A+B)−(D+C). Then, in the preferred embodiment, to make these coordinate signals independent of the intensity of the reflected light, each coordinate signal is divided by the sum of the four quadrant signals (A+B+C+D). The thusly normalized signals are inputted to the means 34 for displaying the output from the processing means 32.

The means 34 for displaying the output from the processing means 34 provides a visible output representative of the light impinging upon each bundle, 12, 14, 16, and 18 of optical fibers 20. Typically, the display will be either a video display on a video monitor or a graphical display on a plotter, or both.

With reference to FIG. 3 wherein an optical measuring system is shown, the sensor head 22 is disposed in a plane to which a workpiece 44 is to be aligned. The light from the sensor head 22 is directed toward the workpiece through a collimnating lens 46 that ensures that the light from the sensor head 22 impinges upon the workpiece 44 as a parallel beam. The reflected light is then received through the quadrants, A, B, C, and D, of the sensor head 22 and directed through the first, second, third, and fourth bundles, 12, 14, 16, and 18, respectively, onto the individual light detectors 42. The results are processed by the means 32 and displayed by the means 34. The workpiece 44 is then aligned, preferably in real time, until each quadrant, A, B, C, and D, of the sensor head 22 receives an equal amount of reflected light from the workpiece 44. At that point the workpiece 44 will be aligned parallel to the plane of the sensor head 22.

Although the present invention has been described herein with respect to one or more specific embodiments, it will be understood that other configurations and arrangements may also be made that do not depart from the spirit and scope of this invention. Hence, the present invention is deemed limited only by the appended claims and the reasonable interpretation thereof.

What is claimed is:

1. An optical fiber quadrant detector comprising:
    a sensor head having a sensor end with a cross sectional area fully defined by first, second, third, and fourth quadrants;
    first, second, third and fourth bundles of optical fibers, each said bundle terminating at one end thereof in a different quadrant of said sensor end; and
    a fifth bundle of optical fibers terminating at one end thereof in the different quadrants of said sensor end, wherein the optical fibers of said fifth bundle are equally intermixed with the optical fibers of the other bundles and distributed over the entire cross sectional area.

2. The optical fiber quadrant detector as claimed in claim 1 wherein the number of optical fibers in each of said first, second, third, and fourth bundles is the same.

3. The optical fiber quadrant detector as claimed in claim 2 wherein the number of optical fibers in said fifth bundle is equal to the sum of said optical fibers in said first, second, third, and fourth bundles.

4. The optical fiber quadrant detector as claimed in claim 1 further comprising:
    means for providing light for transmission through said optical fibers of said fifth bundle such that said light exits said optical fibers of said fifth bundle at said sensor head;
    means for receiving light signals from said optical fibers of said first, second, third, and fourth bundles;
    means for processing said electrical signal outputted from light receiving means; and
    means for displaying said processed signals from said signal processing means.

5. The optical fiber quadrant detector as claimed in claim 1 wherein said optical fibers of said fifth bundle are randomly mixed with said optical fibers of said first, second, third, and fourth bundles in each of said different quadrants of said sensor head.

6. The optical fiber quadrant detector as claimed in claim 1 further comprising;

means for providing light for transmission through said optical fibers of said fifth bundle such that said light exits said optical fibers of said fifth bundle at said sensor head.

7. The optical fiber quadrant detector as claimed in claim 6 wherein said optical fibers of said fifth bundle are equally distributed among said different quadrants of said sensor head such that the amount of light exiting each said different quadrant of said sensor head is the same for each said quadrant.

8. The optical fiber quadrant detector as claimed in claim 1 further comprising:

means for receiving light signals from said optical fibers of said first, second, third, and fourth bundles.

9. The optical fiber quadrant detector as claimed in claim 8 wherein said means for receiving light includes a plurality of light detectors.

10. The optical fiber quadrant detector as claimed in claim 9 wherein each said light detector is disposed to receive light from said optical fibers of only one of said first, second, third, and fourth bundles.

11. The optical fiber quadrant detector as claimed in claim 9 wherein each said light detector includes a photosensitive surface that generates a photocurrent related to the intensity of light impinging thereupon such that each said light detector outputs an electrical signal related to the intensity of the light impinging thereupon.

12. The optical fiber quadrant detector as claimed in claim 11 further comprising: means for processing said electrical signal outputted from said light detectors.

13. The optical fiber quadrant detector as claimed in claim 12 wherein said processing means includes a personal computer.

14. The optical fiber quadrant detector as claimed in claim 12 further comprising: means for displaying said processed signals from said signal processing means.

* * * * *